July 13, 1943.  A. STRAUSS ET AL  2,323,945
MOTOR
Filed Feb. 1, 1940  3 Sheets-Sheet 1

INVENTORS.
Alfred Strauss
Lee S. Tucker
BY Mann, Brown & Cox
ATTORNEYS.

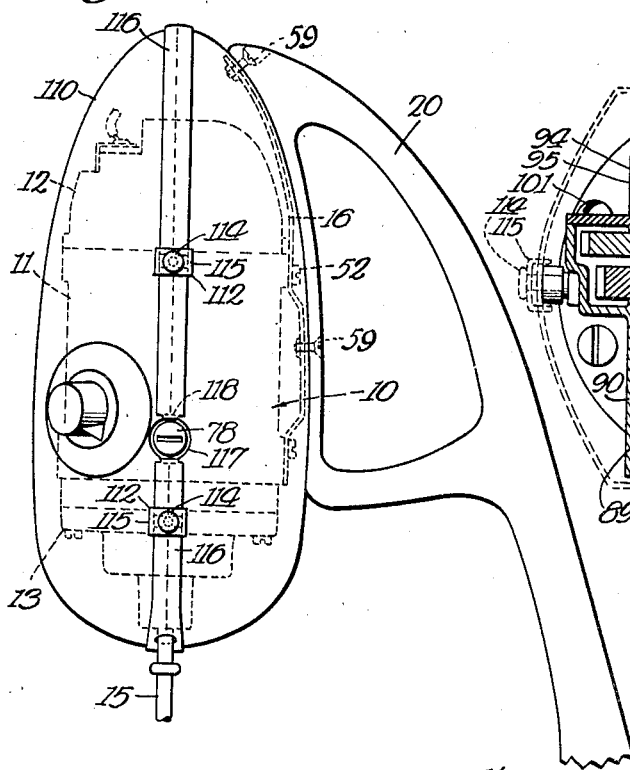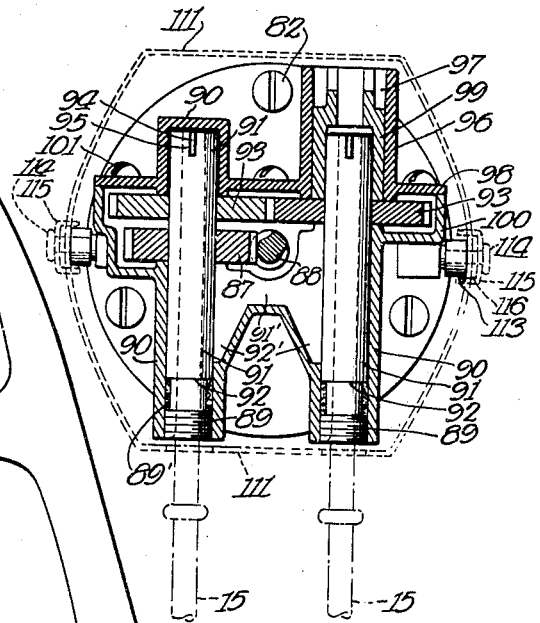

July 13, 1943.  A. STRAUSS ET AL  2,323,945
MOTOR
Filed Feb. 1, 1940  3 Sheets-Sheet 3

INVENTORS.
Alfred Strauss
Lee S Tucker
BY
ATTORNEYS.

Patented July 13, 1943

2,323,945

UNITED STATES PATENT OFFICE 2,323,945

MOTOR

Alfred Strauss and Lee S. Tucker, Chicago, Ill., assignors to A. F. Dormeyer Mfg. Co., a corporation of Illinois Application February 1, 1940, Serial No. 316,758

31 Claims. (Cl. 172—36)

The invention relates to food mixers and has for one of its objects the provision of a construction wherein machined die castings are not subjected to the warping action of the enamel baking heat used in the conventional finishing operation.

Die cast parts never remain the same, and very often identical castings change their shapes in different respects. In other words, the castings "season." This is particularly true of parts that have been lightened by the removal of stock and otherwise have been fashioned and ribbed for strength.

In order to season the castings as much as possible for a rapid turn over of manufacturer's inventory, the parts are annealed in a strain relieving oven before they are machined. However, this process does not season them thoroughly and after the machining operations have been completed, the parts still have strains and stresses that result in a further seasoning that has to be allowed for in the tolerances prescribed for the machining operations.

Food mixers, of course, are subjected to temperature changes in use, but the widest temperature change conventionally encountered after the machining operation is that which takes place in the enamelling operation. It has been found undesirable to perform the enamelling operation before the machining operation since the enamel would be chipped or scarred and the cost of touching up the parts would be greater than the advantage gained as regards seasoning.

In this state of conditions the conventional practice has been to cast, anneal, machine and enamel, and in the machining operation make allowances for the wide changes expected to follow the baking operation, knowing that this operation is the one that causes the greatest change in the otherwise gradual seasoning of the parts.

In the present invention we completely eliminate the baking process for the machined die castings and thereby eliminate the wide changes encountered in the post-machining seasoning. In this way, closer machining tolerances are permitted, and the moving parts are able to adjust themselves to the slight changes that take place during the gradual seasoning in the first two or three years of use.

In addition to this, because of this conventional practice, the advance and changes in design in the food mixer art has been slow. A manufacturer that has worked out the difficulties present in a particular construction is loath to change the construction and incur new difficulties merely to change the design.

Moreover, the converse is equally true. There exists a reluctance to incorporate mechanical improvements where a design has become distinctive and has had good sales acceptance.

It is one of the objects of the present invention to provide a construction and arrangement which obviates these difficulties, yet is simple in construction, lends itself to improvements in construction and design and affords a wide interchange of closely machined castings that results also in more satisfactory system in assembly and testing operations.

A further object of the invention is to provide a power unit that can be used in a plurality of styles and designs of food mixers, and conversely provide a design or style that can be used with differently constructed power units.

Another object of the invention is to provide a construction wherein the power unit is completely encased in a finishing shell that serves as a jacket for the movement of cooling air over the power unit; that serves also as a protective covering that can be removed, repaired, and re-enamelled in event of damage, without disturbing the assembly and the seasoned condition of the machined castings in the power unit.

Moreover, a further purpose of the invention is to provide an improved factory routine wherein the enamelling operation can be carried on simultaneously with the machining and assembly of the power unit. In this way, under seasonal sales conditions, orders can be filled more readily. In this connection, the parts common to several different mixers can be built at leisure and stocked as inventory. The individually characteristic parts can then be readily built and assembled with the stock parts as the orders are placed, thereby spreading the labor and time factor generally encountered in seasonal business.

These being among the objects of the present invention other and further objects such as those relating to improvements in the arrangement, assemblage, and construction of parts, will become apparent from the drawings herein, the description relating thereto and the appended claims.

Referring now to the drawings:

Fig. 3 is a side elevation similar to Fig. 2 showing the parts arranged according to another form of the invention;

Fig. 6 is a section taken on line 6—6 in Fig. 4;

Fig. 7 is an enlarged side elevation of the lower portion of the power unit shown in Fig. 3; and, Fig. 8 is an enlarged view of a construction whereby two half shells may be secured together on the power unit.

Figure 1:
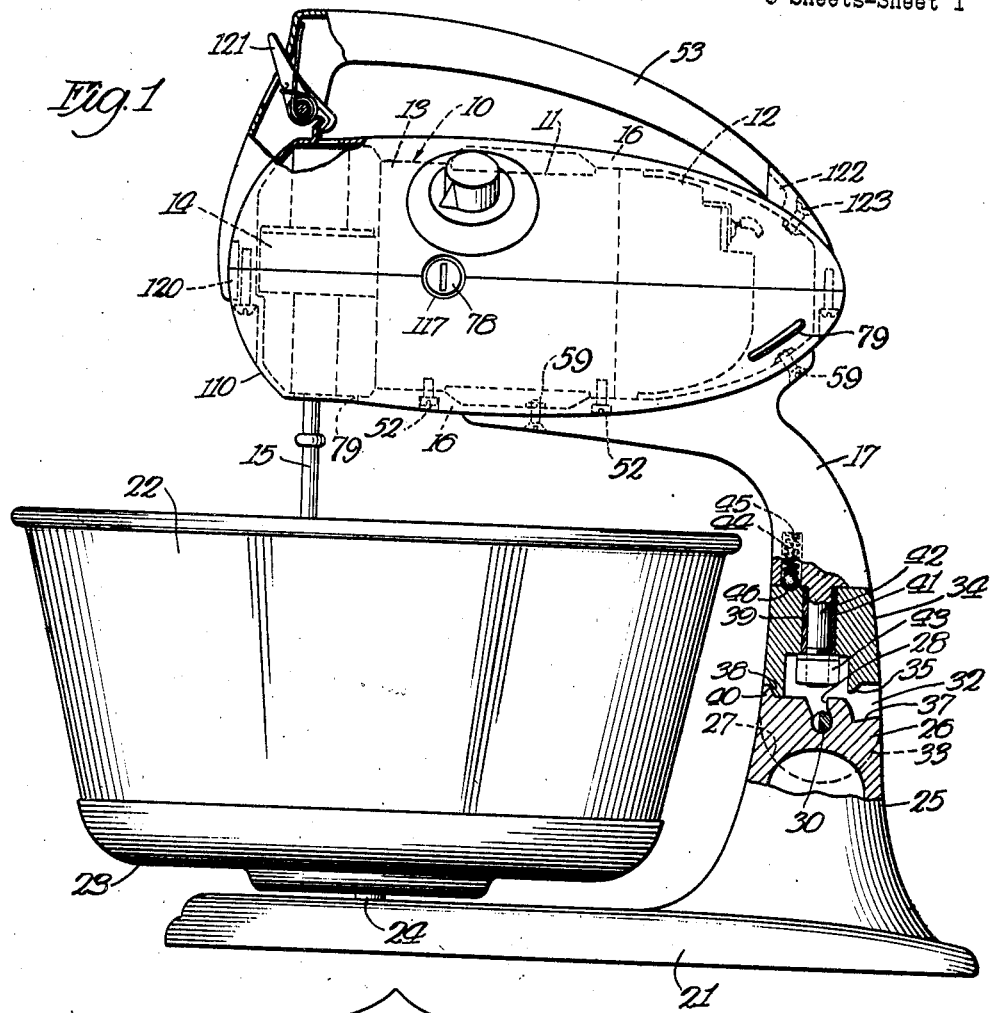
Fig. 1 is a side elevation of a food mixer, partly in section showing the structure and relationship of parts as embodied in one form of the invention.

Throughout the several views of the power unit 10 is illustrated as supported in three different ways. Briefly stated, the power unit is made up of three die cast parts, a central member 11 provided with identical contours upon two portions thereof preferably diametrically opposite each other; a second member 12, secured to the central member in one of two positions preferably spaced 180° from each other which, for purposes of illustration, can be either a rear or top member; and a front or lower member 13 that has cast integrally therewith a transmission casing 14 containing speed reduction gearing provided with a plurality of power outlet sockets for the attachment of food processing tools 15.

In all three embodiments a bracket 16 can be employed whereby the power unit 10 is secured to a support, with the weight of the power unit borne directly by the support through the bracket 16.

The bracket 16 is adapted to be secured to the central member 11 either on the top or bottom thereof in relation to the position of the identical contours thereon.

In Fig. 1 the bracket 16 is cast as an integral part of a die cast shell that is secured to the bottom of the central member 11 and to a support 17 which, in so far as the design is concerned, supports the power unit from underneath.

Figure 2:
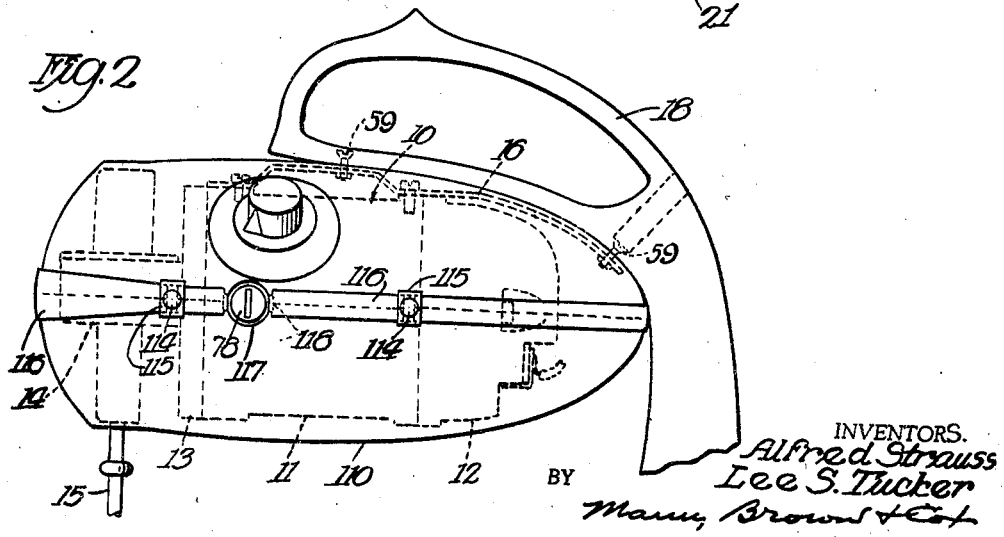
Fig. 2 is a side elevation of the power unit and shell of a food mixer as arranged according to another form of the invention.

In Fig. 2 the bracket is a separate member and is secured to the power unit in a manner supporting the unit from the top by a combination handle and support 18.

In Fig. 3 the power unit is disposed in a vertical position in which it can be supported from either side, also by a combination handle and support 20.

In all three embodiments the supports 17, 18 and 20 are pivotally mounted upon a base 21 in a manner illustrated in Fig. 1 so that the beaters 15 are disposed in a bowl 22 that is mounted upon a turntable 23 journaled, as at 24, in the base 21.

In mounting the several supports upon the base 21 a construction is provided whereby the beaters may be moved manually back and forth in the bowl about a vertical axis, and the power unit may be tilted about a horizontal axis to raise and lower the beaters with respect to the bowl.

The particular construction for accomplishing these pivotal relationships comprises a pedestal 25 on the base 21, having a tongue 26 thereon extending upwardly from between two axially aligned circular cavities 27 cut in the top of the pedestal 25. The tongue 26 is slotted as at 28 to receive in detachable relationship a flat sided pin 30 which can be removed from the slot by a forward and upward movement and is locked in place when otherwise moved or rotated.

The pin 30 is rigidly carried by two downwardly extended forked portions 32 that terminate in cylindrical surfaces 33 mating with the cavities 27 upon the pedestal 25. The forked members are integral portions of an intermediate member 34 which has a stop 35 thereon that engages a stop 37 on the pedestal when the power unit is tilted rearwardly. The intermediate member 34 also has an inclined dog 38 at the front thereof that engages a corresponding inclined lug 40 upon the pedestal whereby the pin 30 is held rearwardly against removal from the slot under the weight of the power unit when lowered.

The intermediate member 34 is drilled at 41 to provide a vertical bore receiving a bearing sleeve 39 that journals a shaft or stud 42 formed integrally with any one of the several supports. The shaft is threaded as at 43 to receive a lock nut and washer thereon, thereby securing any one of the several supports to the intermediate member 34 in pivoted relationship.

A spring and ball assembly 44 is provided in a bore 45 in either the support or the intermediate member, preferably the support, to engage a detent 46 in the other member, in this case the intermediate member 34. The ball and detent predispose or provide a feel for an operator in locating the beaters at any predetermined or desired position in the bowl 22.

In this way a very simple and efficient construction is provided for managing the power unit with respect to the bowl and for the removal of the power unit from the pedestal for operation at a point removed from the bowl.

Figure 4:
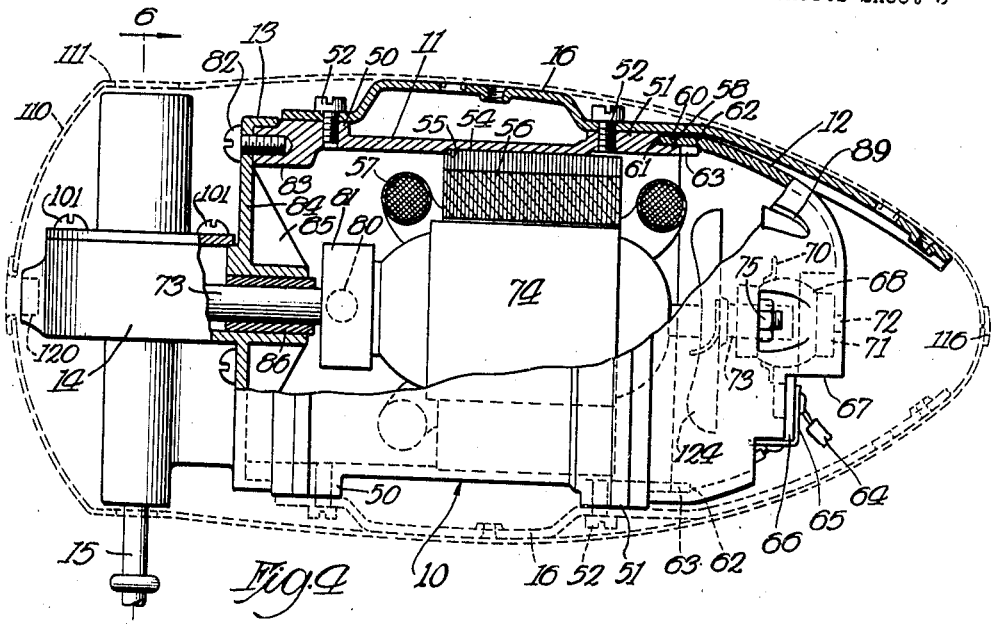
Fig. 4 is an enlarged, partially sectioned side elevation of the power unit shown in Figs. 1 and 2.
Figure 5:
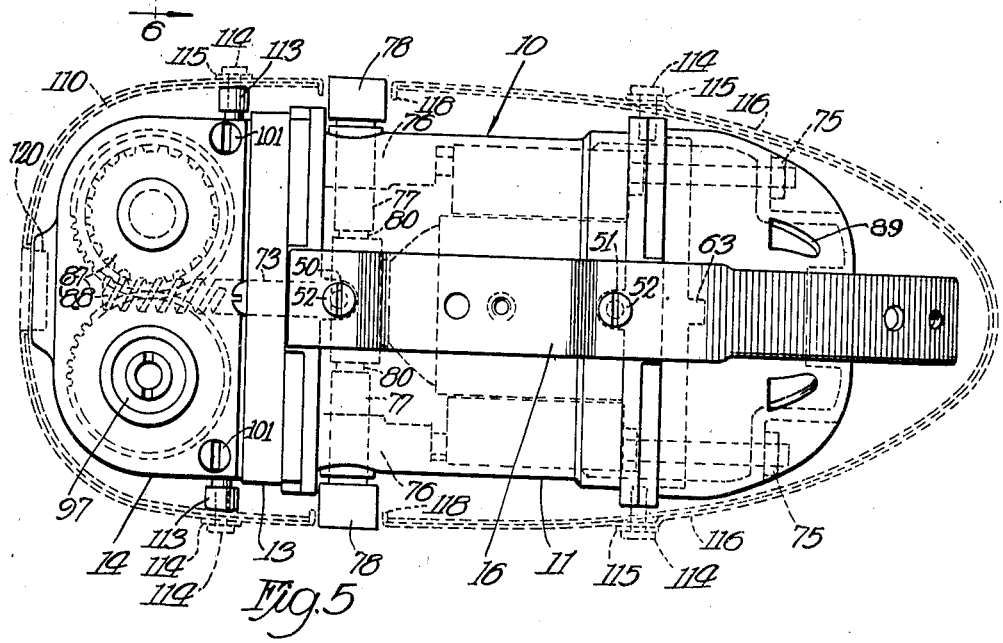
Fig. 5 is an enlarged top plan partially in section of the power unit shown in Fig. 1.

Referring now to the construction of the power unit, reference may be had first to Figs. 4 and 5 wherein the central member is shown as provided with bosses 50 and 51 at the front and rear thereof, respectively, identical upon the top and bottom sides. Either one or both of these bosses may be threaded in the machining operation to receive identical screws 52 to support a bracket 16 either at the top or the bottom, or at the top and the bottom.

In those instances where a combination handle and support is provided, as in Figs. 2 and 3, only one bracket 16 need be supplied, but in the construction shown in Fig. 1 where a handle 53 is secured on the top of the power unit and the support 17 is secured to the bottom thereof, a bracket 16 can be provided at both the top and the bottom, although in the embodiment shown in Fig. 1 the handle is shown as supported by means forming an integral part of the upper shell.

The central member 11 is internally machined to provide a bore 54 and shoulder 55 for locating in place the stator 56 carrying the field coils 57, the stator being secured in place by stud bolt (not shown).

At the right end of the central member 11, as viewed in Fig. 4, the central member is provided with a reduced flange portion 58 which receives a flanged portion 60 upon the rear member 12 against a shoulder 61. At both the top and the bottom, the rear portion 12 is recessed as at 62 to receive an extending locating lug 63 upon the flange 58 in a manner whereby the rear member 12 may be secured to the central member in one of two positions spaced 180° from each other depending upon the desired location of the rear member in relation to the lead-in wires 64 soldered to posts 65 that are mounted upon an insulating member 66 secured in a recessed portion 67 in the rear member 12.

In concentric relationship to the mating flanges 58 and 60, the rear member 12 carries a self-aligning bearing 68 which is held in place by saddle member 70. The self-aligning bearing 68 is closed at one end and is made of a porous metal that is provided with an oil wick 71 at the closed end, supplied with oil from an oil hole 72 to store sufficient oil for a long period of operation.

The bearing 68 receives the rear end of the shaft 73 of the armature 74 and the central member 11 and the rear member 12 are held together by stud and nut assembly shown in phantom at 75.

At the front end of the central member, bosses 76 are radially drilled to receive brush holders 77 that carry Bakelite cap screws 78 threaded on their outer end to hold the brushes 80 against the commutator 81 of the armature 74.

In view of the fact that the rear member 12 may be located in any one of a number of positions relative to the central member 11 and the bracket 16, or equivalent, may be located at the top and bottom of the central member 11, or both, the transmission housing may be secured to the front end of the central member in only one relative position, it being appreciated that it is within the teaching of the invention that either the transmission housing 14 or the rear member 12 may be constructed to be secured to the central member in any one of a plurality of positions, while the other is relatively fixed, and a construction will be provided thereby that may be mounted in any one of the ways shown in Figs. 1, 2 and 3.

More particularly, in the construction shown in Fig. 4, the front end of the central member is reduced to receive the rear end of the transmission housing thereagainst as secured by machine screws 82 threaded into bosses 83 upon the front end of the central member 11.

The rear portion of the transmission housing 14 is so cast as to provide an apertured spider 84 with structural reenforcing ribs 85 supporting a hub and bearing 86 at the center thereof that journals the front end of the armature shaft 73. The shaft 73 extends beyond the bearing 86 in the transmission housing where it is worm threaded as at 88 to engage, as best shown in Fig. 6, a worm wheel 87.

The transmission housing has cast therein four lugs 90 that journal at vertically spaced points, two laterally spaced identical sleeve shafts 91. The shafts 91 terminate at 92 where they rest upon shouldered bearing plugs 89 that receive packing material 89' to prevent seepage of lubricant supplied from a well 91' through slots 92' extending along the shafts 91 above the shoulder 92.

Intermediate the vertically spaced lugs, the shafts 91 carry meshing gears which rotate the shafts 91 in opposite directions to interdigitate the beaters 15. The worm wheel 87 is carried on one of these shafts 91 and in this way power is transmitted from the motor shaft 73 to the beater shafts 91, the beaters 15 being detachably driven by radially displaceable spring elements 94 engaging kerfs 95 cut in at the top of the shafts 91.

One of the upper lugs 90 is made with a larger diameter as indicated at 96, in which is journalled a kerfed shaft 99 secured to the shafts 91 and having a reduced portion 97 at the top thereof to receive in drive relationship a food processing attachment, such as a juicer bowl (not shown).

For purposes of assembly the transmission casing is made in two parts, an upper part 98 and a lower part 100, which are secured together by machine screws 101 to provide a completely enclosed grease chamber around the bearing and the motor shaft whereby all bearings and gears at the front of the power unit are lubricated from a common source.

Referring now to Fig. 7 in which a transmission is provided for the power unit when supported in a vertical position, the lower end of the shaft 73 is provided with helical teeth 102 driving a gear train 103 which otherwise is similar to that shown in Fig. 6 except that the bearing bosses 104 extend axially in relationship to the power unit rather than transversely, as is the case in Fig. 6. In this case, the upper part 109 comparable to the upper part 98, is constructed to serve as an end cover for the lower end of the motor in sealed relation.

All the parts of the power unit described thus far, are not enamelled and are completely concealed from view by a shell 110. Because of this, the mixer may be greatly lightened. Much of the metal stock that has heretofore been used to provide a smooth outer contour for finish purposes can be removed. In fact, because of this, a structurally improved design may be had of the power unit itself and the power unit may be made as small as possible compatible with the size of the armature and the relative working parts. This is a distinction over endeavors heretofore made in food mixers where bulk metal was used to provide a power unit which looked large and strong.

In view of the fact that the parts described are never enamelled, they may be made out of die cast metal with little expectancy of change or warping in seasoning the first few years of their use. Furthermore, by eliminating the heat enamelling for die castings, a better power unit can be provided since the die cast parts after annealing may be machined to closer tolerances than otherwise would be possible if it were necessary to make allowances for warpage due to the baking operation.

It is only the shell 110 that is finished and subjected to enamelling temperatures and since we prefer to fashion the shell out of die cast or stamped metal it is readily apparent that any particular design may be employed and finished in any way which meets with the pleasure of the sales engineer.

In the particular embodiment shown, we provide a shell of a rounded streamline shape with a tapering end thereof disposed at the rear thereof and the expanded end flattened, as at 111, to follow the general contour of the transmission housing in a manner completely enclosing the power take-off sockets.

For purposes of manufacturing economy and assembly we prefer to construct the shell out of two die-processed parts having identical contours with the line of severance disposed upon a horizontal plane, although in Fig. 1, for purposes of illustration, we have shown how one of the parts may be conformed to receive a handle of any particular form.

In certain designs it may be well to locate the line of severance upon a vertical plane or upon a plane which intersects the elements attached to the power unit so that the attached elements may, in some measure, cover the line of severance.

However, be that as it may, in the particular embodiment we have chosen to illustrate our invention with the marginal edges of the half shells 111 disposed horizontally, and in the case of die-stampings preferably have the marginal edges cut to provide T-shaped notches 112 therein. These are shown in detail in Fig. 8, by way of example and their location indicated by the numeral 112 in the remaining figures. U-shaped brackets hook in the notches 112 much in the manner of staples, and where the T-shaped notches coincide with the power unit, the power unit is provided with threaded spacing lugs 113 as shown in Figs. 5 and 7, to receive finishing screws 114 that draw the U-shaped brackets 115 down against the lugs. The die cast shells shown in Fig. 1 may be joined or overlapped in any suitable way that interlocks them in position.

In this way the two halves of the shell are supported against relative displacement and are secured to the power unit in a simple and inexpensive manner.

For purposes of covering up the line of severance, in the die stamped shells, we prefer to provide bands 116, finished in chrome or otherwise, that are straddled and held in place by the U-shaped brackets 115. In the particular construction shown, the cap screws 78 on the brush holders are exposed through die cut notches 117 in the edges of the two shells. The two bands 116 which we employ for the purpose mentioned have a turned-in end projection 118 insertable in the notches 117 along the sides of the cap screws 78 where they are held by the U-shaped brackets 115.

The front one of the brackets 116, as shown in Figs. 2 and 3, gradually widens, if desired, where it passes over the front end of the shell and is provided with die stamped openings 125 as in Fig. 7, where the beater shafts are to be received.

In Fig. 1, the shells are provided with sockets 120 to receive a lug on the handle 53. The latch 121 upon the handle 35 releases the handle for forward movement for removal, otherwise it holds the handle against longitudinal displacement with respect to the power unit. At its rear end the handle 35 is received in a hollow portion 122 on the upper shell which may be integral therewith or a separate member secured to the rear end of the upper bracket 16 by a finishing screw 123, as shown.

Only those openings are provided in the shell parts which are necessary for the shell to accommodate screws 52, 59 and 123, beater shafts 15 and the passage of cooling air. The openings for the admission and emission of cooling air, circulated by the cooling fan 124 are shown in the shell 110 at 79 and in the power unit at 89.

This emphasizes the flexibility with which the particular construction can be adapted for various arrangements of parts having different drive characteristics and differently located power take-off sockets.

In considering the contour of the shell and the size of the power unit inside the shell we turn now to the description of the bracket 16 employed to support the motor power unit rigidly with respect to an element secured thereto without any strain upon the shell. The bracket 16 is constructed preferably in a manner integrally with the shell or as a separate member, whereby it is secured throughout its length alternately to the power unit and to the support which supports the power unit. In this relationship the bracket 16 can be made out of heavy sheet steel, die stamped and contoured to follow or define the inner line of the shell and contact the power unit at spaced points where the bracket is secured to the power unit by screws 52 as already described.

Where the bracket 16 is a separate member, differently shaped or identical power units can be employed to support shells having different designs in a manner whereby a manufacturer with little extra inventory can provide any number of different mixers to jobbers requesting distinctive designs.

Moreover, since the power unit is the most expensive part of the mixer to manufacture and assemble, a comparatively limited inventory of these units may be kept on hand as manufacturer's inventory and used in any particular design of mixer ordered by any particular jobber requiring that design. In this way for all practical purposes the manufacturer has on hand, ready almost for immediate shipment, at any time, as many mixers as he has shells and brackets, it being possible for him to maintain a small inventory of universal power units to be drawn upon from time to time by particular jobbers.

Having thus described the invention, its several improvements over conventionally constructed mixers and having described certain preferred embodiments of the invention, it will be readily apparent to those skilled in the art that various other and further uses and changes may be made without departing from the spirit of the invention, the scope of which is commensurate with the appended claims.

What is claimed is:

1. In a food mixer, a base, a support, a motor, a transmission member driven from the motor, a shell completely enclosing the motor, means rigidly secured with respect to the transmission member and motor for mounting them upon the support, said shell comprising two portions having substantially identical contours secured to the motor and contoured at one end to follow the gross shape of the motor and transmission enclosed therein, and handle means for supporting the shell, motor and transmission.

2. In a food mixer, a standard, means supporting the standard for relative pivotal movement about a plurality of axes, a motor, a bracket securing the motor to the standard, a transmission supported on the motor and having a plurality of power take-off sockets, a finishing shell completely enclosing the motor and said sockets and having apertures therethrough for the reception of food processing tools in said sockets, and a handle following the contour of said shell and mounted in weight supporting relationship relative to the motor.

3. In a food mixer, a motor unit having a contour comprising a pair of identical portions and a pair of symmetrical portions upon its surface, said portions comprising points of support, a bracket secured to one of said identical portions, said motor unit including an armature supporting member secured in place with respect to the rest of the unit in one of two positions with regard to the location of said bracket, a shell enclosing said unit in spaced relation and secured thereto at the symmetrical portions, and means secured to the bracket for supporting the motor unit without any strain upon the shell.

4. In a food mixer, a motor member having a contour comprising a pair of identical portions and a pair of symmetrical portions upon its surface, said portions comprising points of support, a bracket secured to one of said identical portions, a shell enclosing said motor member in spaced relation and secured thereto at the symmetrical portions, and means secured to the bracket for supporting the motor without any strain upon the shell.

5. In a food mixer, a motor member having a plurality of portions of its surface provided with identical contours, a bracket secured to one of the portions, a finishing shell secured to the motor over the bracket, and means secured to the bracket for supporting the motor without any strain upon the shell.

6. In a food mixer, a motor member having a plurality of portions of its surface provided with identical contours, a bracket secured to each of two of said identical contours, a finishing shell secured to the motor over the brackets, means secured to one of said brackets for supporting the motor member and shell, and means secured to the other bracket for supporting the motor and shell, in both instances without strain upon the shell.

7. In a food mixer, a motor member, a second member secured to the motor member at one end thereof, means adapted to support said members from the top and the bottom and a finishing shell portion secured relative to the motor, means secured to said means for supporting the motor member and shell, and handle means engaging said shell and releasably secured to the shell for supporting the motor and shell.

8. In a food mixer, a motor member having identical contours over a plurality of portions of its surface, bracket means secured to each of two of the identical contours, a second member secured to the motor member at one end thereof, a finishing shell secured to the motor to cover the motor member, bracket means and the second member, said shell having a socket at one end, means secured to one of said bracket means for supporting the motor member and shell, handle means detachably secured to the other bracket means at one end and releasably engaging in said socket at the other end also for supporting the motor and shell, and means for releasably holding said handle means against removal from its supporting relationship.

9. In combination with a food mixer having a motor and transmission housing, a finishing shell enclosing the motor comprising a plurality of parts defining lines of separation, means for supporting the shell in spaced relationship to the motor at said lines of separation, band finishing means covering the lines of separation, and means interlocking adjacent edges of said shell for holding said band means in place.

10. In a food mixer, a motor member, a bracket secured to the motor member, a finishing shell secured to the motor member over the bracket, said shell comprising a plurality of parts marginally defining lines of severance, combination handle and support means secured to the bracket for supporting the motor and shell without strain upon the shell, band means covering said lines of severance, and means interlocking adjacent edges of the shell parts for securing them relative to each other in spaced relationship to the motor member and for holding said bands in place.

11. In a food mixer, a motor member having a pair of symmetrical contours over a plurality of portions of its surface, a bracket secured to the motor member, a finishing shell secured to the motor and enclosing the bracket, said finishing shell comprising two parts of identical contours defining symmetrical lines of separation at said symmetrical contours, means for covering said lines of separation including means for supporting the marginal edges of the two parts with respect to each other and in spaced relationship to the motor, and means secured to the bracket for supporting the motor and shell without strain upon the shell.

12. In a food mixer having a stator and an armature, a central member supporting the stator and having structural portions on both sides of a horizontal plane including bosses having substantially identical contours, a rear end member adapted to be secured to the rear end of the central member in any one of two positions and having a bearing therein supporting one end of the armature and an opening for the passage of air, a front member carrying a transmission secured to the front end of the central member to support the front end of the armature and having a plurality of power take-off sockets, a shell comprising two parts of identical contour completely enclosing the front, central and rear members, one of said parts having openings for the passage of air therethrough, both of said parts having openings over said sockets, said shell and central members being in close proximity to each other over a portion of their respective contours, and means for securing a support to said central member upon either the top or the bottom, and spacer means for securing the marginal edges of the two-part shell together in spaced relationship to said central member.

13. In a food mixer having a base and a bowl mounted thereon, the combination of a support, a central member, a bracket supporting the central member on the support in spaced relation, a stator core supported in the central member, members secured to opposite ends of the central member for supporting an armature in the central member, one of said members including a gear casing having a plurality of power take-off sockets, a shell completely enclosing all of said members and the bracket, and means supported relative to one of said members for serving as a handle.

14. In a food mixer, a unitary motor and transmission assembly adapted to support a beater, a finishing shell, means upon the assembly for engaging the inside of the shell at predetermined points, a handle adapted to engage the outside of the shell at said points, means securing the handle, shell and assembly together as a unitary assembly including a means releasably holding the handle in place for removal at will.

15. In a food mixer, a unitary motor and transmission assembly adapted to support a beater, a finishing shell, means upon the assembly for engaging the inside of the shell at predetermined points, a handle adapted to engage the outside of the shell at certain of said points, a support for engaging the outside of the shell at certain other of said points, means for securing the handle and support with respect to the shell and assembly at said respective points as a unitary assembly including a means releasably holding the handle in place for removal at will.

16. In a food mixer having a base and a bowl mounted thereon, the combination of a support, a power unit comprising a central construction including a stator, members secured to opposite ends of the central construction for supporting an armature in the stator, one of said members including a cast gear casing having journalled therein a plurality of power take-off shafts, a finishing shell having a plurality of parts enclosing all of the members, means secured to the power unit and disposed within the confines of the shell for mounting the power unit and shell upon the support, and means supported relative to one of said members for serving as a handle.

17. In a food mixer having a base and a bowl mounted thereon adjacent one end of the base, the combination of a support secured to the base adjacent the other end, a power unit overhanging the bowl and comprising a central part including a stator, members secured to opposite ends of the central part for supporting an armature in the stator, one of said members including a combined transmission and lubricant housing having journalled therein a plurality of power take-off shafts disposed over the bowl, a finishing shell having a plurality of parts enclosing all of the members, means secured to the power unit and disposed within the confines of the shell for mounting the power unit and shell upon the support, and means supported relative to one of said members for serving as a handle.

18. In a food mixer, a motor member, a second member secured to the motor member at one end thereof, means adapted to support said members from the bottom, means secured with respect to the motor member for carrying the weight of the motor, a finishing shell secured relative to the motor, means secured to said first means for supporting the motor member and shell, and handle means mounted with respect to the second mentioned means for supporting the motor and shell, said handle means being movable with respect to the motor to and from an upwardly effective weight supporting relationship.

19. In a food mixer, a motor member, a second member secured to the motor member at one end thereof comprising a transmission and an upwardly presenting juicer attachment support and drive means, means adapted to support said members from the bottom, a finishing shell for the motor member and second member, means adapted to support the weight of the motor and shell including a handle and weight bearing bracket disposed inside the shell, and means for inserting the handle in vertical weight bearing position and for removing the handle from over said juicer support and drive means to provide access thereto.

20. In a food mixer, a motor member, a second member secured to the motor member at one end thereof comprising a transmission having an upwardly presenting boss thereon providing a power take-off drive, means adapted to support said members by hand and upon a base including a handle terminating forwardly well short of said drive to provide access thereto, a finishing shell portion secured relative to the motor member around said members and boss, said handle means engaging said shell for supporting the motor and shell as a unit.

21. In combination with a power unit comprising an assembly of outwardly rough members for supporting the field core and armature of an electrically powered food mixer including an outwardly irregularly formed transmission housing, an outwardly finished light sheet metal shell covering said members comprising a plurality of die made members, a heavy metal member secured to the assembly and supporting a portion of the finished light sheet metal shell, and a handle secured to the heavy metal member for supporting the assembly without strain upon the shell.

22. In a food mixer having a base and support, a motor; a transmission mounted upon and driven from the motor as a unitary assembly including bosses having power shafts mounted therein, said unitary assembly being machined for mechanical purposes irrespective of outward appearances; a shell enclosing said motor, the transmission and the bosses; said shell comprising a plurality of portions having marginal edges which are symmetrical with respect to a predetermined line of separation and providing a finished covering for the assembly and the bosses; means securing the shell to the motor; means for securing the edges with respect to each other; and means for supporting the motor and transmission including a handle and an element covered by said shell, said element carrying the strain between the handle and the assembly.

23. In a food mixer having a base and support, a power unit comprising a motor including a housing having a rough unfinished exterior, means for mounting the power unit upon the support including a member rigidly carried by said housing, an irregularly shaped transmission housing supported upon the motor housing, a shell covering said housings and member, said shell comprising a plurality of die formed members, one having a pair of symmetrical marginal edges, means for securing the shell to the power unit including a member interconnecting said element and shell, said shell being contoured to follow the gross shape of said housings, and handle means secured to the motor including an element connected to the power unit.

24. In a food mixer having a base and support, a motor, a machine hollow cast body mounted upon the motor to provide a unitary assembly including bosses having journals therein, power shafts mounted in the journals, a finished shell completely enclosing said motor, cast body and bosses, said shell comprising a plurality of light gauge die formed elements providing a symmetrical contour with respect to a predetermined plane passing through the assembly and having lines following the gross shape of the motor, cast body and bosses, means securing the shell to the motor, and handle means for supporting the motor and transmission.

25. In a food mixer the combination of a power device and cover, said power device comprising two spaced members providing journals for the armature of an electric motor, one of said members comprising a machined casting provided with bearings for journalling power take-off shafts, means interconnecting the said members for supporting a field core for the motor in spaced relation to the bearings, said cover for said members and means comprising a plurality of die stamped metal members covering said members and means, said cover having a pair of symmetrical marginal edges, means for securing the cover at the marginal edges and to the power device including an element interconnecting said edges, an element interconnecting the power device and cover in supported relation, a handle, and means for securing the handle to the power device in weight supported relation including a weight supporting member secured to the handle and power device.

26. In a food mixer the combination of a power device and cover, said power device comprising two spaced members providing journals for the armature of an electric motor, one of said members comprising a machined casting provided with bearings for journalling power take-off shafts, means interconnecting the said members for supporting a field core for the motor in spaced relation to the bearings, said cover for said members and means comprising a plurality of die stamped metal members covering said members and means, said cover having a pair of symmetrical marginal edges, means for securing the cover at the marginal edges and an element interconnecting said power device and cover in supported relation, a handle, and means for securing the handle to the power device in weight supported relation including a weight supporting die stamped member secured to the handle, and a connection with the casting in weight supporting relation.

27. In a food mixer having a support, a motor having a speed control actuated by a manually rotatable member and having a plurality of brush holders, a transmission secured to the motor and driven therefrom including bosses housing a pair of gear driven elements, a grease box around the gearing, a cover for the grease box permitting access to the gearing; a shell enclosing the motor, transmission, speed control holders, bosses and grease box cover; said shell comprising a plurality of die formed elements having openings provided in them to provide access to the bosses, speed control and holders; handle means for the speed control mounted exteriorly of the shell and brush caps for the holders exposed through a pair of said openings.

28. In a food mixer, a motor, a member secured to the motor at one end thereof comprising a transmission having vertical bosses thereon providing power take-off drives, a second member secured at the other end of the motor, one of said members being secured to the motor in any one of a plurality of relative positions, means adapted to support said members and motor by hand and upon a base including a handle, a finishing shell portion secured relative to the motor around said members and bosses, said handle means engaging said shell for supporting the motor and shell as a unit.

29. In a food mixer having a base and a bowl mounted thereon, the combination of a support, a motor including a stator, members secured to opposite ends of the motor for supporting an armature in the stator, one of said members including a gear casing having a plurality of power take-off sockets, said members and motor being machined and assembled for mechanical operation irrespective of outward appearance and without subsequent application of general heat approaching baking temperatures to permit the material of the motor and members to "season" solely during use, means for supporting the motor and members in weight bearing relationship with respect to the support, a shell covering the last mentioned means and the motor and said members, said shell having an applied finish thereon, and means supported relative to one of said members for serving as a handle.

30. In a food mixer having a base and a bowl mounted thereon, the combination of a support, a motor including a stator, members secured to opposite ends of the motor for supporting an armature in the stator, one of said members including a cast gear casing having a plurality of power take-off sockets, said members and motor being machined and assembled without subsequent application of general heat approaching baking temperatures so that the material of the motor and members "seasons" at atmospheric temperatures during use, means for supporting the motor and members in weight bearing relationship with respect to the support, a die formed shell covering the last mentioned means and the motor and said members, said shell having an applied baked finish thereon, and means supported relative to one of said members for serving as a handle.

31. In a food mixer, a base, a support, a motor, a die made bracket secured to the motor for mounting the motor upon the support, a transmission member supported on the motor, a housing completely enclosing the motor, transmission member and the bracket supported on the motor, said housing comprising a plurality of portions having substantially identical parts on opposite sides of a medial plane, said portions being secured to the motor at their margins and contoured at one end to follow the gross shape of the motor and transmission enclosed therein, and handle means engaging the transmission in weight supporting relationship.

ALFRED STRAUSS.
LEE S. TUCKER.